(12) United States Patent
Tsumori

(10) Patent No.: US 9,194,310 B2
(45) Date of Patent: Nov. 24, 2015

(54) CONTROL APPARATUS FOR VEHICLE, VEHICLE AND METHOD OF CONTROLLING VEHICLE

(75) Inventor: Chika Tsumori, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 96 days.

(21) Appl. No.: 14/233,664

(22) PCT Filed: Aug. 11, 2011

(86) PCT No.: PCT/JP2011/004565
§ 371 (c)(1),
(2), (4) Date: Jan. 17, 2014

(87) PCT Pub. No.: WO2013/021429
PCT Pub. Date: Feb. 14, 2013

(65) Prior Publication Data
US 2014/0195128 A1    Jul. 10, 2014

(51) Int. Cl.
| H02P 17/00 | (2006.01) |
| F02D 29/02 | (2006.01) |
| F02N 11/08 | (2006.01) |

(52) U.S. Cl.
CPC ............ *F02D 29/02* (2013.01); *F02N 11/0818* (2013.01); *F02N 2200/061* (2013.01); *F02N 2200/063* (2013.01); *Y02T 10/48* (2013.01)

(58) Field of Classification Search
CPC ...................... F02N 2200/063; F02N 2200/064
See application file for complete search history.

(56) References Cited

U.S. PATENT DOCUMENTS

| 2005/0000481 A1 | 1/2005 | Asakawa et al. |
| 2009/0241883 A1* | 10/2009 | Nagoshi et al. ............ 123/179.4 |
| 2010/0256897 A1* | 10/2010 | Takata et al. .................. 701/113 |
| 2012/0150406 A1* | 6/2012 | Tomura et al. .................. 701/70 |
| 2013/0231848 A1* | 9/2013 | Roberts et al. ................ 701/112 |
| 2014/0288803 A1* | 9/2014 | Deisler ......................... 701/103 |

FOREIGN PATENT DOCUMENTS

| EP | 1 657 436 A3 | 5/2006 |
| JP | 11-257122 A | 9/1999 |
| JP | 2005-023887 A | 1/2005 |
| JP | 2005-320977 A | 11/2005 |
| JP | 2006-138221 A | 6/2006 |
| JP | 2008-254603 A | 10/2008 |
| JP | 2009-292315 A | 12/2009 |

OTHER PUBLICATIONS

International Search Report for PCT/JP2011/004565 dated Oct. 25, 2011.

* cited by examiner

*Primary Examiner* — Tisha Lewis
(74) *Attorney, Agent, or Firm* — Sughrue Mion, PLLC

(57) ABSTRACT

A control apparatus for a vehicle that suppresses degradation of the durability performance of a battery, while improving the fuel consumption of a vehicle. The control includes an engine, a battery that is chargeable with power of the engine, a configurator that sets a start condition for starting an engine according to a state of the battery; and a starter that starts the engine when the start condition is satisfied.

7 Claims, 6 Drawing Sheets

CONTROL APPARATUS FOR VEHICLE, VEHICLE AND METHOD OF CONTROLLING VEHICLE

CROSS REFERENCE TO RELATED APPLICATIONS

This application is a National Stage of International Application No. PCT/JP2011/004565 filed Aug. 11, 2011, the contents of all of which are incorporated herein by reference in their entirety.

TECHNICAL FIELD

The present invention relates to a control apparatus for a vehicle equipped with an engine and a battery, a vehicle and a method of controlling a vehicle.

BACKGROUND ART

With a recent demand for improvement of the fuel consumption of automobiles, vehicles having the function of idle reduction have drawn attention. For example, a technique disclosed in Patent Literature 1 is known as the technology relating to the timing of a restart of an engine from the state of idle reduction. This proposed technique sets the timing of a restart of the engine from the state of idle reduction in an MT (manual transmission) vehicle to the time of a release of a clutch pedal after a gear change with a step-on of the clutch pedal.

This proposed technique, however, causes a relatively long engine stop time, which results in extending the discharge time of a battery and may lead to untimely degradation of the durability performance of the battery.

This problem is not limited to the MT vehicles but is commonly found in any vehicles having the function of idle reduction, such as AT (automatic transmission) vehicles.

CITATION LIST

Patent Literature

[PTL 1] JP 2006-138221A
[PTL 2] JP 2005-320977A
[PTL 3] JP H11-257122A

SUMMARY OF INVENTION

Technical Problem

In order to solve at least parts of the problems of the prior art described above, the object of the invention is to provided a technology of suppressing degradation of the durability performance of a battery, while improving the fuel consumption of a vehicle.

Solution to Problem

In order to solve at least part of the problems described above, the invention provides aspects and embodiments described below.

[Aspect 1]

There is provided a control apparatus for a vehicle, which includes an engine and a battery that is chargeable with power of the engine, the control apparatus comprising:

a configurator that sets a start condition for starting the engine according to a state of the battery; and a starter that starts the engine when the start condition is satisfied.

This configuration sets the condition for starting the engine according to the state of the battery, so that the discharge time of the battery is changed according to the state of the battery. This suppresses degradation of the durability performance of the battery, while improving the fuel consumption of the vehicle.

[Aspect 2]

There is provided the control apparatus described in Aspect 1, wherein the vehicle further includes a manual transmission and a clutch that connects and disconnects the engine with and from the manual transmission, wherein the configurator sets that the manual transmission or the clutch is in a specified state, as the start condition according to the state of the battery.

In the vehicle equipped with the manual transmission and the clutch, this configuration starts the engine in operation timing of a driver who drives the vehicle. This reduces the driver's uncomfortable feeling.

[Aspect 3]

There is provided the control apparatus described in either one of Aspects 1 and 2, wherein the state of the battery includes a voltage value of the battery, and the configurator sets the start condition such as to start the engine at an earlier timing with a decrease in voltage value, while setting the start condition such as to start the engine at a later timing with an increase in voltage value.

The voltage value of the battery reflects the state of the battery. Accordingly, this configuration adequately suppresses degradation of the durability performance of the battery.

[Aspect 4]

There is provided the control apparatus described in Aspect 3 dependent on Aspect 2, wherein the configurator sets the start condition at a timing of: a start of disconnection of the engine from the manual transmission by the clutch when the voltage value of the battery is less than a first threshold value; a change in gear position of the manual transmission from a neutral position to a drive position when the voltage value of the battery is equal to or greater than the first threshold value but is less than a second threshold value that is greater than the first threshold value; and a start of connection of the engine with the manual transmission by the clutch when the voltage value of the battery is equal to or greater than the second threshold value.

The battery is vulnerable to degradation of the durability performance when being used in the state of a low voltage value. This configuration starts the engine at the earlier timing to start charging the battery earlier with a decrease in voltage value of the battery, while starting the engine at the later timing to start charging the battery later with an increase in voltage value of the battery. This adequately suppresses degradation of the durability performance of the battery, while improving the fuel consumption of the vehicle.

[Aspect 5]

There is provided the control apparatus described in either one of Aspects 1 and 2, wherein the state of the battery includes a temperature of the battery, and the configurator sets the start condition such as to start the engine at an earlier timing with a decrease in temperature, while setting the start condition such as to start the engine at a later timing with an increase in temperature.

The temperature of the battery reflects the state of the battery. Accordingly, this configuration adequately suppresses degradation of the durability performance of the battery.

[Aspect 6]

There is provided the control apparatus described in Aspect 5 dependent on Aspect 2, wherein the configurator sets the start condition at a timing of: a start of disconnection of the engine from the manual transmission by the clutch, as when the temperature of the battery is less than a first threshold value; a change in gear position of the manual transmission from a neutral position to a drive position when the temperature of the battery is equal to or greater than the first threshold value but is less than a second threshold value that is greater than the first threshold value; and a start of connection of the engine with the manual transmission by the clutch when the temperature of the battery is equal to or greater than the second threshold value.

The battery has the lower charging acceptability at the lower temperature. This configuration starts the engine at the earlier timing to start charging the battery earlier with a decrease in temperature of the battery, while starting the engine at the later timing to start charging the battery later with an increase in temperature of the battery. This reduces insufficient charging of the battery, while improving the fuel consumption of the vehicle.

[Aspect 7]

There is provided the control apparatus described in either one of Aspects 4 and 6, wherein the configurator sets the first threshold value and the second threshold value according to an operating condition of auxiliary machinery mounted on the vehicle.

The state of the battery is affected by the operating condition of the auxiliary machinery. This configuration takes into account the operating condition of the auxiliary machinery, thus further adequately suppressing degradation of the durability performance of the battery.

[Aspect 8]

There is provided the control apparatus described in either one of Aspects 4 and 6, wherein the configuration sets the first threshold value and the second threshold value by learning an operation of the manual transmission and an operation of the clutch by a driver who drives the vehicle.

Drivers may differ in the timings of the operations of the manual transmission and the clutch. This configuration learns the operations of the driver, thus further adequately suppressing degradation of the durability performance of the battery.

[Aspect 9]

There is provided a vehicle, comprising: an engine; a battery that is chargeable with power of the engine; and the control apparatus described in any one of Aspects 1 to 8.

This configuration sets the condition for starting the engine according to the state of the battery, so that the discharge time of the battery is changed according to the state of the battery. This suppresses degradation of the durability performance of the battery, while improving the fuel consumption of the vehicle.

[Aspect 10]

There is provided a method of controlling a vehicle, which includes an engine and a battery that is chargeable with power of the engine, the method comprising: (a) setting a start condition for starting the engine according to a state of the battery; and (b) starting the engine when the start condition is satisfied.

This method sets the condition for starting the engine according to the state of the battery, so that the discharge time of the battery is changed according to the state of the battery. This suppresses degradation of the durability performance of the battery, while improving the fuel consumption of the vehicle.

The invention may be implemented by various aspects: for example, a control method of the vehicle and a control apparatus for the vehicle, a vehicle control system, integrated circuits and computer programs configured to implement the method or achieve the functions of the apparatus, and a recording medium in which such a computer program is recorded.

DESCRIPTION OF EMBODIMENTS

Figure 1:
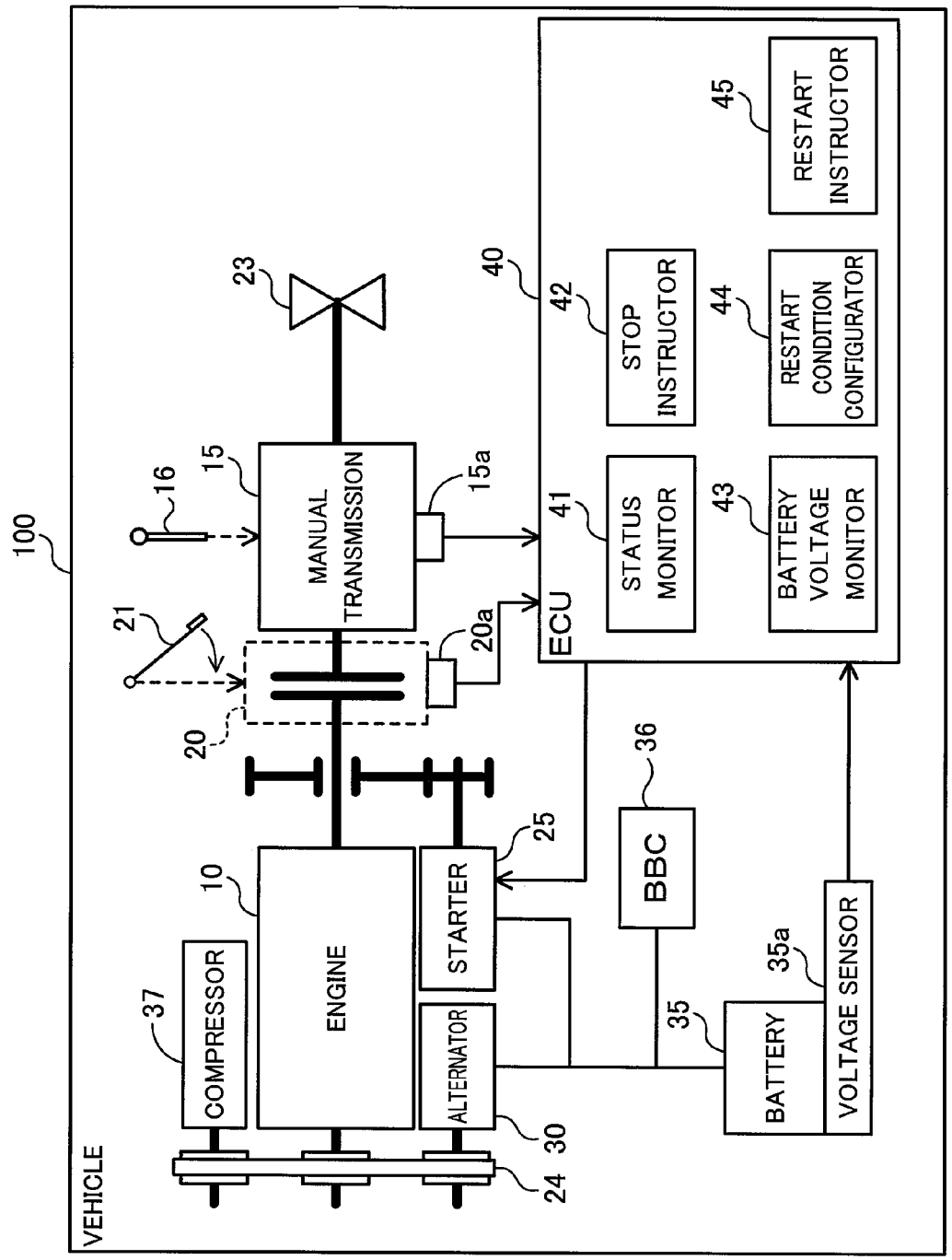
FIG. 1 is a diagram illustrating the configuration of a vehicle 100 according to one embodiment of the invention.

The following describes some aspects of the invention with reference to embodiments in the following sequence:
A. First Embodiment
B. Second Embodiment
C. Modifications A. First Embodiment FIG. 1 is a diagram illustrating the configuration of a vehicle 100 according to one embodiment of the invention. The vehicle 100 is an MT vehicle having the function of idle reduction to stop an engine when the vehicle is stopped and to restart the engine at a specified timing. The vehicle 100 includes an engine 10, a manual transmission 15, a clutch 20, a differential gear 23, a drive mechanism 24, a starter 25, an alternator 30, a battery 35, a back-up boost converter (BBC) 36, a compressor 37 and an electrical control unit (ECU) 40.

Additionally, as various sensors, the manual transmission 15 is provided with a gearshift sensor 15a; the clutch 20 is provided with a clutch sensor 20a; and the battery 35 is provided with a voltage sensor 35a. In the specification hereof, peripheral equipment provided other than the engine body to operate with the electric power of the battery 35, for example, the starter 25, an ignition plug (not shown) and an air conditioner (not shown) are called "auxiliary machinery". Each of these auxiliary machines is provided with a power sensor (not shown) to detect the power consumption of the auxiliary machine.

The engine 10 is an internal combustion engine configured to generate power by combustion of a fuel such as gasoline or light oil. The power of the engine 10 is transmitted to the manual transmission 15 via the clutch 20, while being transmitted to the alternator 30 and the compressor 37 via the drive mechanism 24. The output of the engine 10 is changed by an engine controller (not shown) according to the step-on amount of an accelerator pedal (not shown).

The manual transmission 15 changes the gear ratio (changes the gear position) in response to the driver's operation. The manual transmission 15 of the embodiment changes the gear position among eight different states (eight gear positions): a neutral position, forward drive positions (first speed to sixth speed) and a backward drive position, in response to the driver's operation of a gearshift lever 16. The forward drive positions (first speed to sixth speed) and the backward drive position are collectively called drive position. The power (rotation speed and torque) of the engine 10 is subject to a gear change by the manual transmission 15 to be converted to desired rotation speed and torque and is transmitted to left and right drive wheels (not shown) via the differential gear 23. The gearshift sensor 15a outputs a gearshift signal showing the state (gear position) of the manual transmission 15.

The clutch 20 is provided between the engine 10 and the manual transmission 15 and connects and disconnects the engine 10 with and from the manual transmission 15 in response to the driver's operation. More specifically, when the driver steps on a clutch pedal 21, the engaged state (power transmission state) of the clutch 20 is released, so that the engine 10 is disconnected from the manual transmission 15. The driver operates the gearshift lever 16 in the state that the engine 10 is disconnected from the manual transmission 15 (power non-transmission state) to change the gear ratio of the manual transmission 15. When the driver subsequently releases the clutch pedal 21, the clutch 20 is again set to the engaged state (power transmission state), so that the engine 10 is connected with the manual transmission 15 having the changed gear ratio. The power of the engine 10 is changed according to the step-on amount of the accelerator pedal in this manner and is transmitted to the drive wheels via the manual transmission 15 to accelerate or decelerate the vehicle.

The clutch sensor 20a outputs a clutch signal showing the state of the clutch 20 (state of the clutch pedal 21). According to this embodiment, the clutch sensor 20a monitors the strokes of the clutch pedal 21 and thereby detects a start of the step-on of the clutch pedal 21 (i.e., a start of disconnection of the engine 10 from the manual transmission 15) and a start of the release of the clutch pedal 21 (i.e., a start of connection of the engine 10 with the manual transmission 15). This clutch signal is supplied to the ECU 40.

The power of the engine 10 is also transmitted to the alternator 30 and the compressor 37 via the drive mechanism 24 as described above. In the vehicle shown in FIG. 1, a belt drive structure is employed for the drive mechanism 24.

The alternator 30 uses part of the power of the engine 10 to generate electric power. The generated electric power is used to, for example, light up headlamps and charge the battery 35 via an inverter (not shown). The battery 35 is a DC power source having the voltage of 14 V and is used to, for example, light up the headlamps and drive the starter 25. The voltage sensor 35a detects the voltage of the battery 35 and outputs a voltage signal showing the voltage value of the battery 35. This voltage signal is supplied to the ECU 40.

The BBC 36 stabilizes the electric power supplied from the battery 35 and supplies the electric power to respective devices, such as an air conditioner (not shown), a car navigation system and the ECU 40. The compressor 37 uses the power of the engine 10 to produce the compressed air.

The starter 25 is a starter motor configured to start the engine 10 with the electric power supplied from the battery 35. In general, when the driver operates an ignition switch (not shown) to start driving the stopped vehicle, the starter 25 is activated to start the engine 10. This starter 25 is also used to restart the engine 10 from the state of idle reduction as described later. The ECU 40 includes, for example, a CPU, a ROM and a RAM and executes a program stored in advance in the ROM to control the respective devices. The following describes the function of idle reduction.

The ECU 40 includes a status monitor 41, a stop instructor 42, a battery voltage monitor 43, a restart condition configurator 44 and a restart instructor 45 as the control system for enabling the function of idle reduction.

The status monitor 41 receives the gearshift signal and the clutch signal and thereby monitors the statuses of the manual transmission 15 and the clutch 20. More specifically, the status monitor 41 detects the gear position of the manual transmission 15, a start of the step-on of the clutch pedal 21 and a start of the release of the clutch pedal 21. When the neutral position of the manual transmission 15 is detected during a stop of the vehicle 100, the stop instructor 42 outputs an instruction signal for stopping the engine 10 and thereby stops the engine 10 (idle reduction).

The battery voltage monitor 43 receives the voltage signal output from the voltage sensor 35a and thereby monitors the voltage of the battery 35. The restart condition configurator 44 sets the restart condition of the engine 10, based on the voltage of the battery 35 monitored by the battery voltage monitor 43. According to this embodiment, the restart condition configurator 44 sets that the manual transmission 15 or the clutch 20 is in a specified state, as the restart condition. When the restart condition set by the restart condition configurator 44 is satisfied, the restart instructor 45 outputs an instruction signal for restarting the engine 10 and thereby restarts the engine 10. The following describes the details of the operations of the restart condition configurator 44 and the restart instructor 45.

Figure 2:
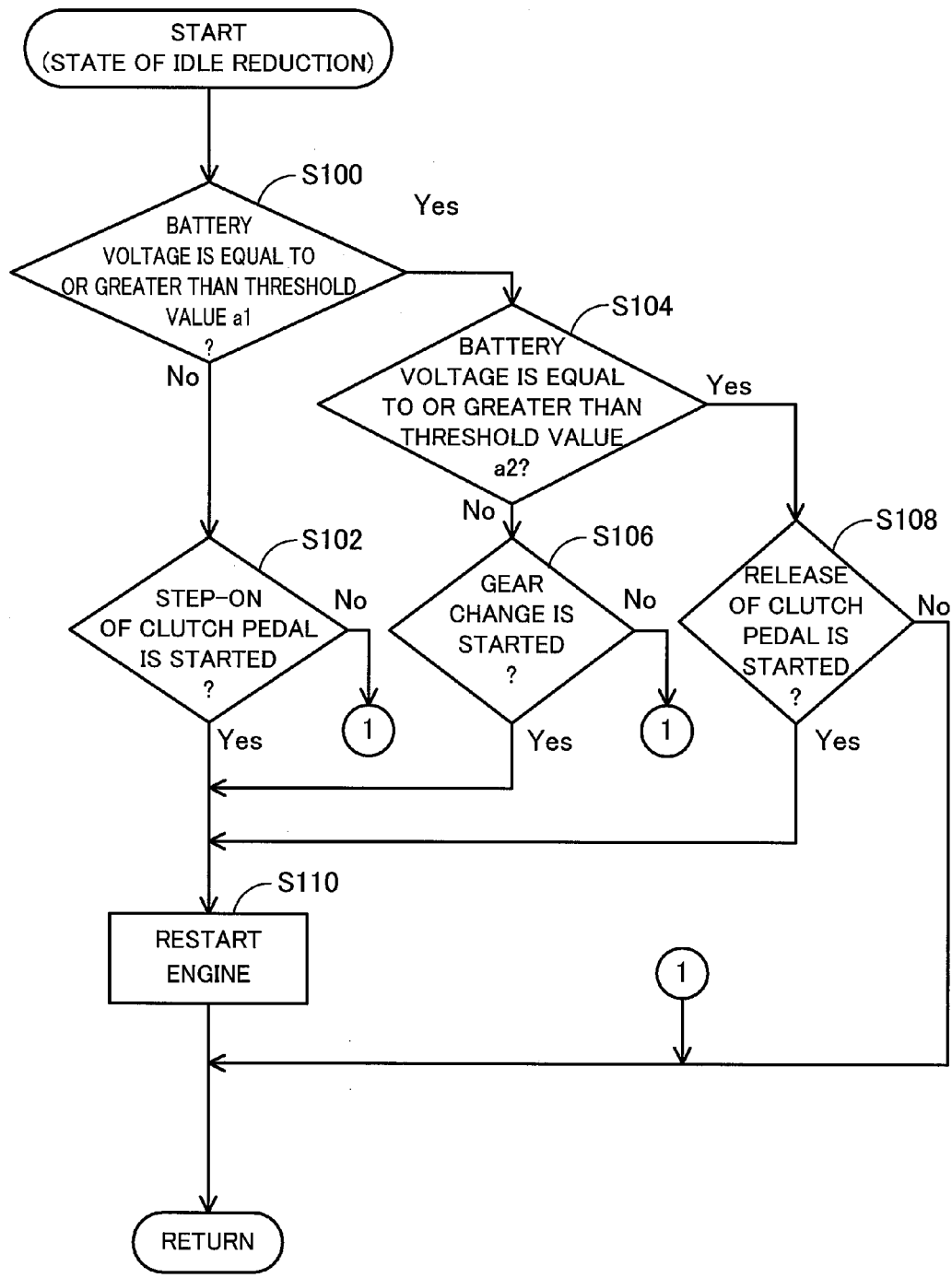
FIG. 2 is a flowchart showing a processing flow to restart an engine 10 after idle reduction.

FIG. 2 is a flowchart showing a processing flow to restart the engine 10 after idle reduction. At step S100, the restart condition configurator 44 determines whether the battery voltage is equal to or greater than a threshold value a1. When the battery voltage is less than the threshold value a1 (step S100: No), the restart condition configurator 44 sets that the step-on of the clutch pedal 21 is started, as the restart condition of the engine 10, and the restart instructor 45 determines whether the step-on of the clutch pedal 21 is started (step S102).

When the step-on of the clutch pedal 21 is started (step S102: Yes), the restart instructor 45 outputs an instruction signal for restarting the engine 10 to the starter 25 and thereby restarts the engine 10 (step S110). When the step-on of the clutch pedal 21 is not started (step S102: No), the engine 10 is not restarted.

When the battery voltage is equal to or greater than the threshold value a1 (step S100: Yes), on the other hand, the restart condition configurator 44 determines whether the battery voltage is equal to or greater than a threshold value a2 (step S104). When the battery voltage is less than the threshold value a2 (step S104: No), the restart condition configurator 44 sets that the gear change is started, as the restart condition of the engine 10, and the restart instructor 45 determines whether the gear change is started (step S106). Starting the gear change means a change in gear position of the manual transmission 15 from the neutral position to the drive position.

When the gear change is started (step S106: Yes), the restart instructor 45 outputs the instruction signal for restarting the engine 10 to the starter 25 and thereby restarts the engine 10 (step S110). When the gear change is not started (step S106: No), the engine 10 is not restarted.

When the battery voltage is equal to or greater than the threshold value a2 (step S104: Yes), the restart condition configurator 44 sets that the release of the clutch pedal 21 is started, as the restart condition of the engine 10, and the restart instructor 45 determines whether the release of the clutch pedal 21 is started (step S108).

When the release of the clutch pedal 21 is started (step S108: Yes), the restart instructor 45 outputs the instruction signal for restarting the engine 10 to the starter 25 and thereby restarts the engine 10 (step S110). When the release of the clutch pedal 21 is not started (step S108: No), the engine 10 is not restarted.

Figure 3:
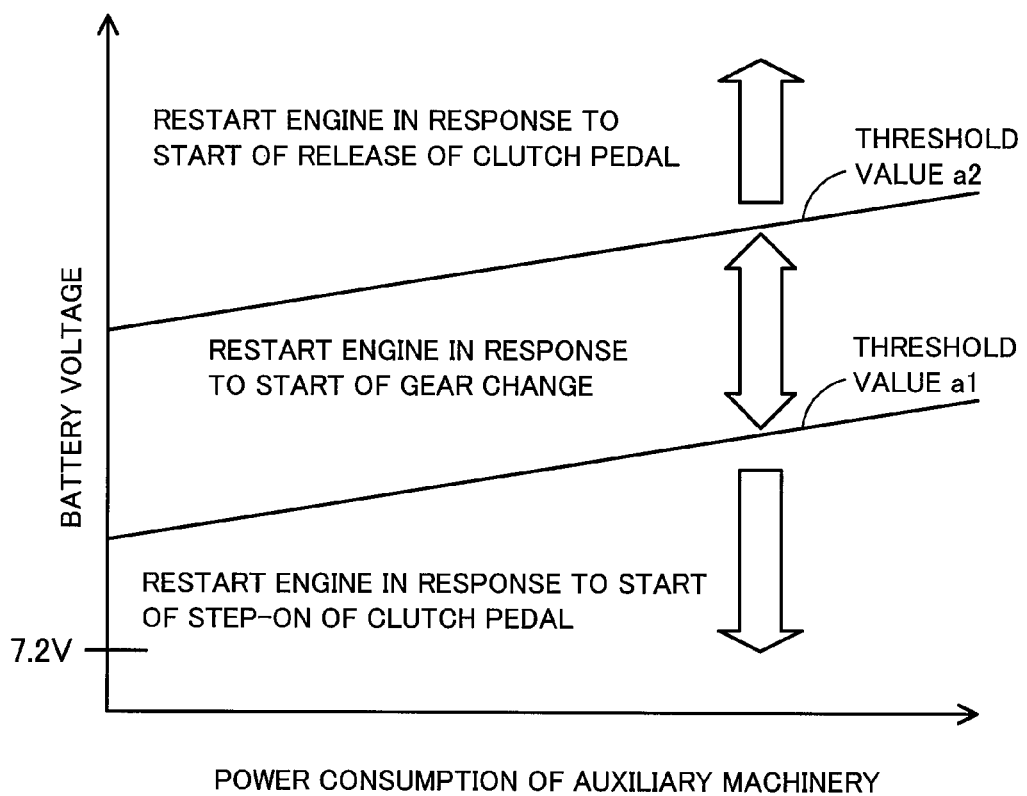
FIG. 3 is a diagram showing a relationship between the power consumption of auxiliary machinery mounted on the vehicle 100 and threshold values a1 and a2.

FIG. 3 is a diagram showing a relationship between the power consumption of the auxiliary machinery mounted on the vehicle 100 and the threshold values a1 and a2. An increase in power consumption of the auxiliary machinery results in an increase in discharge amount of the battery 35 and causes the battery 35 to be vulnerable to degradation of the durability performance. The restart condition configurator 44 of this embodiment accordingly monitors signals from the power sensors provided on the respective auxiliary machines and sets the threshold values a1 and a2 according to the power consumption of the auxiliary machinery. More specifically, the restart condition configurator 44 sets larger values to the threshold values a1 and a2, with an increase in power consumption of the auxiliary machinery. On the other hand, the restart condition configurator 44 sets smaller values to the threshold values a1 and a2, with a decrease in power consumption of the auxiliary machinery. With an increase in power consumption of the auxiliary machinery, this restarts the engine 10 at the earlier timing and starts charging the battery 35 earlier. On the other hand, with a decrease in power consumption of the auxiliary machinery, this restarts the engine 10 at the later timing and starts charging the battery 35 later. This appropriately suppresses degradation of the durability performance of the battery 35.

The threshold values a1 and a2 are set to larger values than a minimum voltage value (7.2 V in this embodiment) required to restart the engine 10. When the voltage of the battery 35 is equal to or less than the minimum voltage value, the engine 10 is not stopped (idle reduction is not performed).

As described above, the procedure of the first embodiment sets the restart condition of the engine 10 based on the voltage value of the battery 35 and thus changes the discharge time of the battery 35 according to the voltage value of the battery 35. This suppresses degradation of the durability performance of the battery 35, while improving the fuel consumption of the vehicle 100. The battery 35 is especially vulnerable to degradation of the durability performance when being used in the state of a low voltage value. The procedure of this embodiment accordingly restarts the engine 10 at the earlier timing and starts charging the battery 35 earlier with a decrease in voltage value of the battery 35. This prevents the battery 35 from being used in the state of a low voltage value for a long time and thereby suppresses degradation of the durability performance of the battery 35.

Moreover, according to this embodiment, the restart condition configurator 44 sets the timing of the driver's operation of the vehicle 100, i.e., a start of the gear change of the manual transmission 15, a start of the step-on of the clutch pedal 21 and a start of the release of the clutch pedal 21, as the restart condition of the engine 10. This prevents the engine 10 from being restarted at the driver's unexpected timing and thereby reduces the driver's uncomfortable feeling.

Additionally, the procedure of this embodiment starts charging the battery 35 earlier with an increase in power consumption of the auxiliary machinery and thus more appropriately suppresses degradation of the durability performance of the battery 35.

B. Second Embodiment

Figure 4:
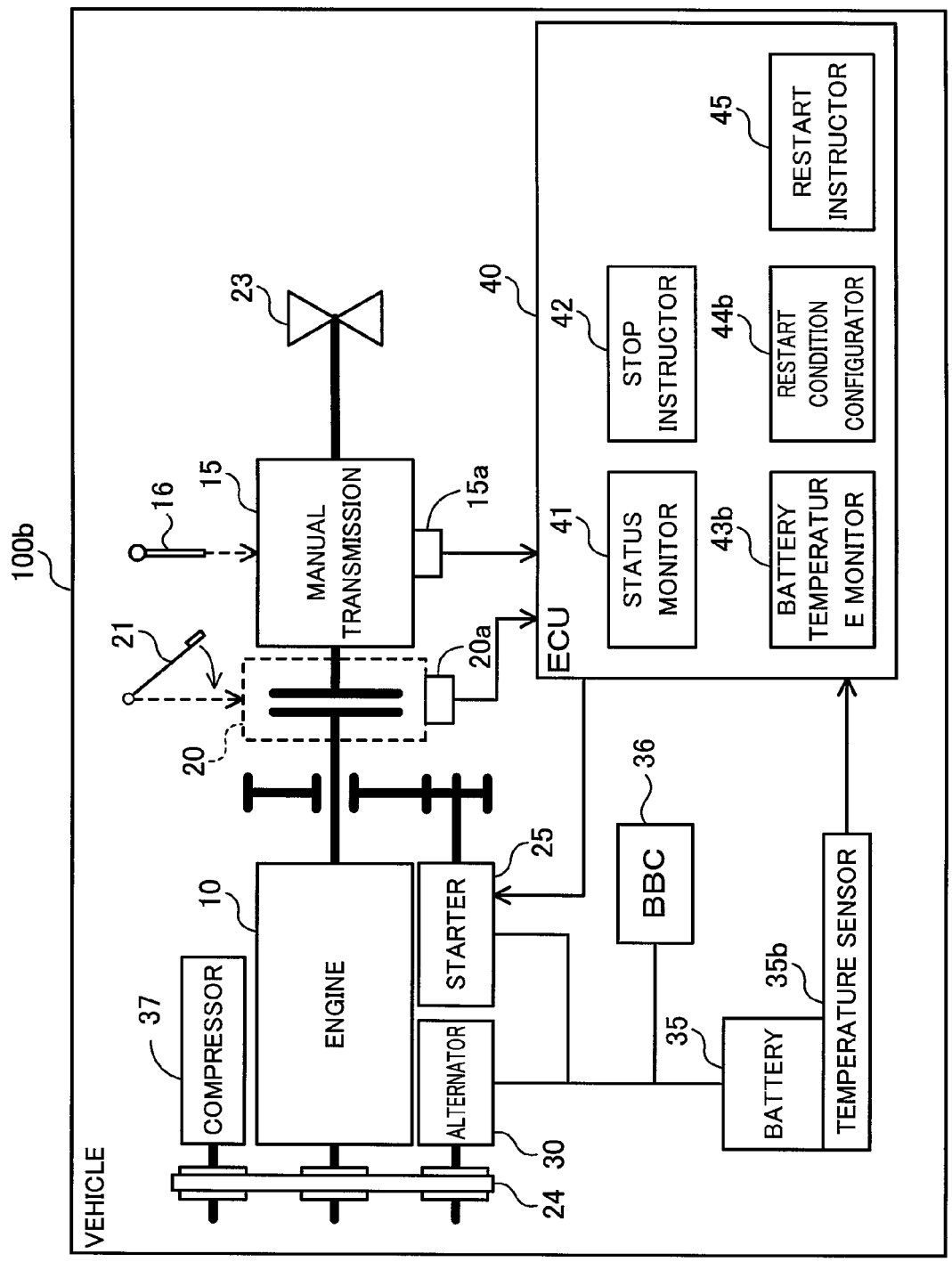
FIG. 4 is a diagram illustrating the configuration of a vehicle 100b according to a second embodiment.

FIG. 4 is a diagram illustrating the configuration of a vehicle 100b according to a second embodiment. The second embodiment differs in only the following points from the first embodiment shown in FIG. 1 but otherwise has the same configuration as that of the first embodiment:

providing a temperature sensor 35b to detect the temperature of the battery 35, in place of the voltage sensor 35a;

providing a battery temperature monitor 43b to monitor the temperature of the battery 35, in place of the battery voltage monitor 43; and the restart condition configurator 44b sets the restart condition of the engine 10 based on the temperature of the battery 35, instead of based on the voltage of the battery 35.

Figure 5:
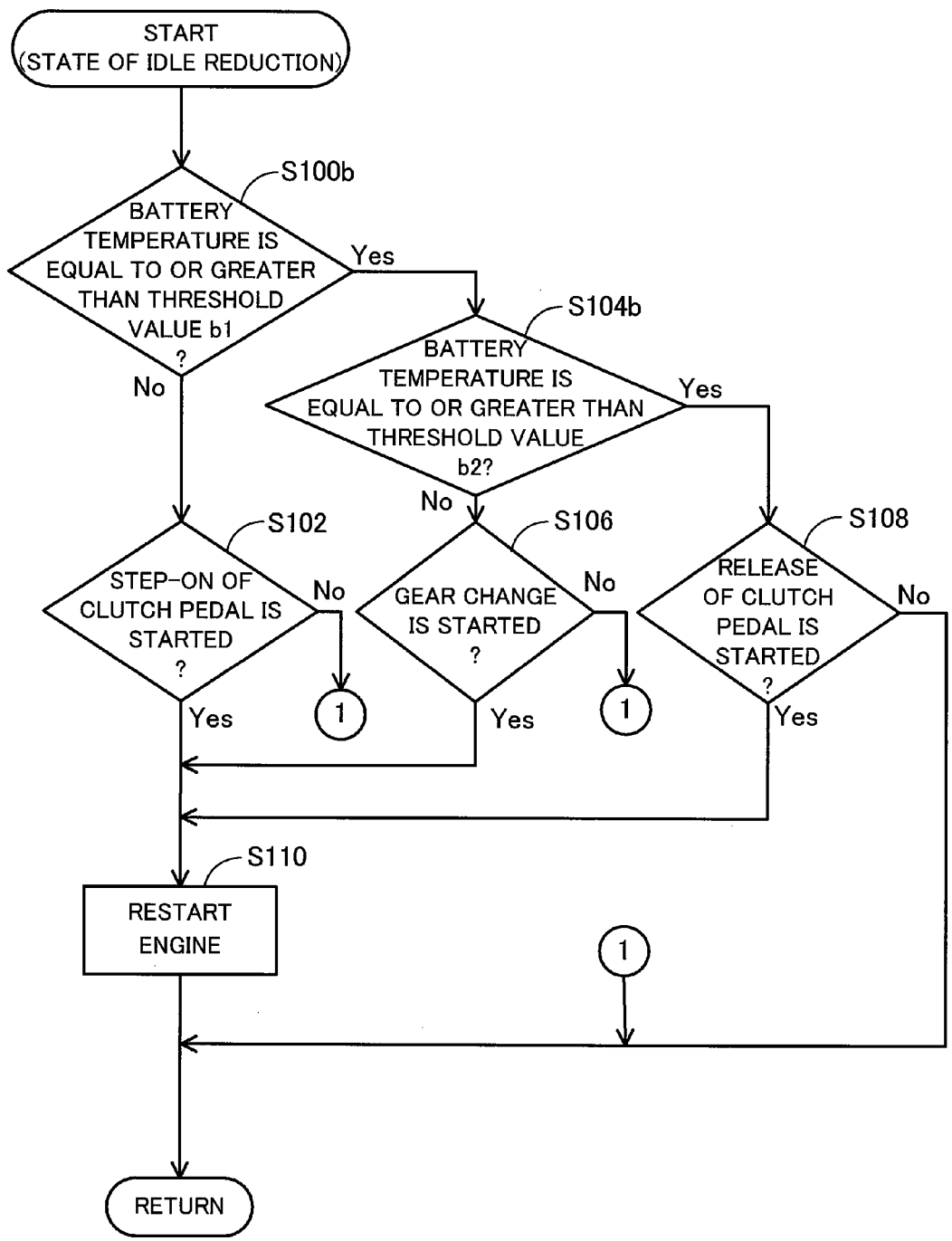
FIG. 5 is a flowchart showing a processing flow to restart the engine 10 after idle reduction in the vehicle 100b of the second embodiment.

FIG. 5 is a flowchart showing a processing flow to restart the engine 10 after idle reduction in the vehicle 100b of the second embodiment. This processing flow differs from the first embodiment shown in FIG. 2 in that the restart condition configurator 44b compares the battery temperature with a threshold value b1 and a threshold value b2 and sets the restart condition of the engine 10 at step S100b and at step S104b, but is otherwise similar to the processing flow of the first embodiment.

Figure 6:
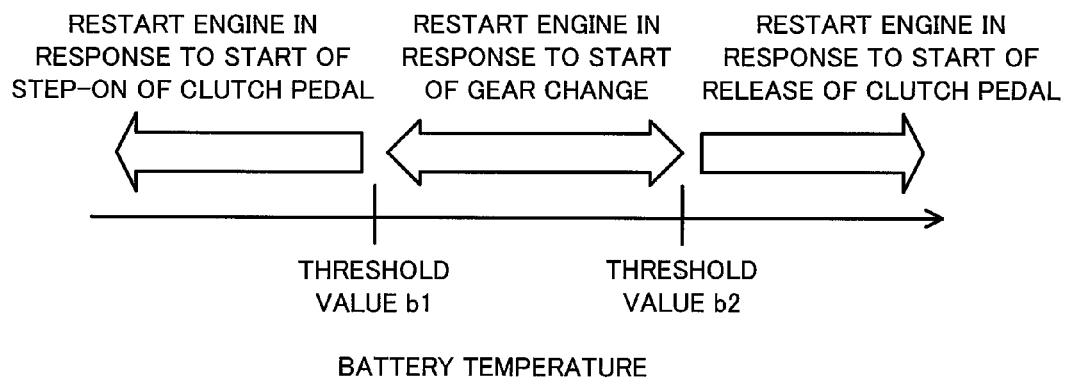
FIG. 6 is a diagram showing a relationship of restart conditions of the engine 10 to the battery temperature and threshold values b1 and b2.

FIG. 6 is a diagram showing a relationship of the restart conditions of the engine 10 to the battery temperature and the threshold values b1 and b2. As shown in FIG. 6, the procedure of the second embodiment restarts the engine 10 in response to a start of the step-on of the clutch pedal 21 when the temperature of the battery 35 is less than the threshold value b1, restarts the engine 10 in response to a start of the gear change of the manual transmission 15 when the temperature of the battery 35 is equal to or greater than the threshold value b1 but is less than the threshold value b2, and restarts the engine 10 in response to a start of the release of the clutch pedal 21 when the temperature of the battery 35 is equal to or greater than the threshold value b2.

The battery 35 has the lower charging acceptability at the lower temperature. The procedure of this embodiment restarts the engine 10 at the earlier timing and starts charging the battery 35 earlier with a decrease in temperature of the battery 35, while restarting the engine 10 at the later timing and starting charging the battery 35 later with an increase in temperature of the battery 35. This suppresses degradation of the durability performance of the battery 35, while reducing insufficient charging of the battery 35. The threshold values b1 and b2 may be set according to the performance of the battery 35.

C. Modifications

The invention is not limited to the embodiments or aspects described above but may be implemented by any of various other aspects without departing from the spirit and scope of the invention. Some examples of possible modifications are described below.

C1. Modification 1

In the above embodiments, the restart condition configurator 44 sets that the manual transmission 15 or the clutch 20 is in the specified state, as the restart condition. The restart condition configurator 44 may, however, employ another condition as the restart condition. For example, in an AT vehicle without the manual transmission 15 and the clutch 20, the restart condition configurator 44 may set a start of the release of a brake pedal or a start of the step-on of an accelerator pedal, as the restart condition.

In the above embodiments, the restart condition configurator 44 selectively sets the restart condition among the three conditions. The restart condition configurator 44 may, however, selectively set the restart condition between two conditions or among four or more conditions.

The invention is applicable to hybrid vehicles using the motor power and the regenerative braking and plug-in hybrid vehicles having a battery chargeable from an outlet. Additionally, the invention is also applicable to a motorcycle equipped with an engine and a battery. In the case of the motorcycle, a clutch starts disconnection of an engine from a manual transmission in response to the driver's pull of a clutch lever, while starting connection of the engine with the manual transmission in response to the driver's release of the clutch lever.

C2. Modification 2

In the above embodiments, the restart condition configurator sets the restart condition of the engine 10, based on either one of the voltage and the temperature of the battery 35. The restart condition configurator may, however, set the restart condition of the engine 10, based on both the voltage and the temperature of the battery 35. In the latter case, the restart condition configurator may use a table having the voltage and the temperature of the battery 35 as two inputs and the restart condition of the engine 10 as one output.

C3. Modification 3

In the first embodiment described above, the restart condition configurator 44 sets the threshold values a1 and a2 according to the power consumption of the auxiliary machinery. The restart condition configurator 44 may, however, set the threshold values a1 and a2 according to the amount of electric power as a cumulative value of power consumption of the auxiliary machinery for a predetermine time period (for example, 5 minutes). In other words, the restart condition configurator 44 may set the threshold values a1 and a2 according to the use condition of electric power by the auxiliary machinery. Moreover, the restart condition configurator 44 may set the threshold values a1 and a2 according to the operating condition of the auxiliary machinery, for example, the power on or power off of the auxiliary machinery, instead of the use condition of electric power by the auxiliary machinery. The threshold values a1 and a2 may be fixed values, independently of the use condition of the auxiliary machinery.

The restart condition configurator 44 may set the threshold values a1 and a2 by learning the driver's operations of the manual transmission and the clutch. The driver's operation may be learnt by storing the interval of operation of the manual transmission or the clutch in a predetermined time period and calculating the average time interval of the operation. The threshold values a1 and a2 may be set based on the calculated average time.

More specifically, when an average time t1 of the driver's operation from the gear change to the release of the clutch pedal 21 is longer than a predetermined time, the restart condition configurator 44 may set a smaller value to the threshold value a2, so as to decrease the interval between the threshold value a1 and the threshold value a2. This expands the range where the "start of the release of the clutch pedal 21" is set as the restart condition of the engine 10. Even when the voltage of the battery 35 is dropped during a time period from the driver's gear change to the release of the clutch pedal 21, this makes the restart condition of the engine 10 less likely to change from the "start of the release of the clutch pedal 21" to the "start of the gear change". Accordingly, this prevents the engine 10 from being restarted at the driver's unexpected timing by the change of the restart condition of the engine 10.

When an average time t2 of the driver's operation from the step-on of the clutch pedal 21 to the gear change is longer than a predetermined time, on the other hand, the restart condition configurator 44 may increase the interval between the threshold value a1 and the threshold value a2. This expands the range where the "start of the gear change" is set as the restart condition of the engine 10. Even when the voltage of the battery 35 is dropped during a time period from the driver's step-on of the clutch pedal 21 to the gear change, this makes the restart condition of the engine 10 less likely to change from the "start of the gear change" to the "start of the step-on of the clutch pedal 21". Accordingly, this prevents the engine 10 from being restarted at the driver's unexpected timing by the change of the restart condition of the engine 10.

Similarly, in the second embodiment, the restart condition configurator 44b may set the threshold values b1 and b2 according to the operating condition of the auxiliary machinery or may set the threshold values b1 and b2 by learning the driver's operations of the manual transmission and the clutch.

C4. Modification 4

In the above embodiments, the engine 10 is stopped during a stop of the vehicle 100. The engine 10 may, however, be stopped during a drive of the vehicle 100. For example, in response to detection of the neutral position of the manual transmission 15 during a drive of the vehicle 10 at a predetermined speed or a lower speed, the engine 10 may be stopped. This enables momentum driving of the vehicle 100 with the engine 10 stopped.

C5. Modification 5

Part of the functions implemented by the software configuration in the above embodiments may be implemented by the hardware configuration, and part of the functions implemented by the hardware configuration may be implemented by the software configuration.

REFERENCE SIGNS LIST

10 Engine
15 Manual transmission
15a Gearshift sensor
16 Gearshift lever
20 Clutch
20a Clutch sensor
21 Clutch pedal
23 Differential gear
24 Drive mechanism
25 Starter
30 Alternator
35 Battery
35a Voltage sensor
35b Temperature sensor
36 BBC
37 Compressor
40 ECU
41 Status monitor
42 Stop instructor
43 Battery voltage monitor
43b Battery temperature monitor
44 Restart condition configurator
44b Restart condition configurator
45 Restart instructor
100 Vehicle
100b Vehicle

The invention claimed is:

1. A control apparatus for a vehicle, which includes an engine, a battery that is chargeable with power of the engine, a manual transmission and a clutch that connects and disconnects the engine with and from the manual transmission, the control apparatus comprising:
   a configurator that sets a start condition for starting the engine according to a voltage value of the battery; and
   a starter that starts the engine when the start condition is satisfied, wherein
   the configurator sets the start condition at a timing of:
   a start of disconnection of the engine from the manual transmission by the clutch when the voltage value of the battery is less than a first threshold value;
   a change in gear position of the manual transmission from a neutral position to a drive position when the voltage value of the battery is equal to or greater than the first threshold value but is less than a second threshold value that is greater than the first threshold value; and
   a start of connection of the engine with the manual transmission by the clutch when the voltage value of the battery is equal to or greater than the second threshold value.

2. A control apparatus for a vehicle, which includes an engine, a battery that is chargeable with power of the engine, a manual transmission and a clutch that connects and disconnects the engine with and from the manual transmission, the control apparatus comprising:
   a configurator that sets a start condition for starting the engine according to a temperature of the battery; and
   a starter that starts the engine when the start condition is satisfied, wherein
   the configurator sets the start condition at a timing of:
   a start of disconnection of the engine from the manual transmission by the clutch, as when the temperature of the battery is less than a first threshold value;
   a change in gear position of the manual transmission from a neutral position to a drive position when the temperature of the battery is equal to or greater than the first threshold value but is less than a second threshold value that is greater than the first threshold value; and
   a start of connection of the engine with the manual transmission by the clutch when the temperature of the battery is equal to or greater than the second threshold value.

3. The control apparatus according to claim 1, wherein the configurator sets the first threshold value and the second threshold value according to an operating condition of auxiliary machinery mounted on the vehicle.

4. The control apparatus according to claim 1, wherein the configuration sets the first threshold value and the second threshold value by learning an operation of the manual transmission and an operation of the clutch by a driver who drives the vehicle.

5. A vehicle, comprising:
   an engine;
   a differential gear that is connected to the engine through a manual transmission;
   a battery that is chargeable with power of the engine; and
   the control apparatus according to claim 1.

6. A method of controlling a vehicle, which includes an engine, a battery that is chargeable with power of the engine, a manual transmission and a clutch that connects and disconnects the engine with and from the manual transmission, the method comprising:
   (a) setting a start condition for starting the engine according to a voltage value of the battery; and
   (b) starting the engine when the start condition is satisfied, wherein
   the step (a) comprises:
   a step of setting the start condition at a timing of a start of disconnection of the engine from the manual transmission by the clutch when the voltage value of the battery is less than a first threshold value,
   a step of setting the start condition at a timing of a change in gear position of the manual transmission from a neutral position to a drive position when the voltage value of the battery is equal to or greater than the first threshold value but is less than a second threshold value that is greater than the first threshold value, and
   a step of setting the start condition at a timing of a start of connection of the engine with the manual transmission by the clutch when the voltage value of the battery is equal to or greater than the second threshold value.

7. A method of controlling a vehicle, which includes an engine, a battery that is chargeable with power of the engine, a manual transmission and a clutch that connects and disconnects the engine with and from the manual transmission, the method comprising:
   (a) setting a start condition for starting the engine according to a temperature of the battery; and
   (b) starting the engine when the start condition is satisfied, wherein
   the step (a) comprises:
   a step of setting the start condition at a timing of a start of disconnection of the engine from the manual transmission by the clutch when the temperature of the battery is less than a first threshold value,
   a step of setting the start condition at a timing of a change in gear position of the manual transmission from a neutral position to a drive position when the temperature of the battery is equal to or greater than the first threshold value but is less than a second threshold value that is greater than the first threshold value, and
   a step of setting the start condition at a timing of a start of connection of the engine with the manual transmission by the clutch when the temperature of the battery is equal to or greater than the second threshold value.

* * * * *